(12) United States Patent
Langen et al.

(10) Patent No.: US 8,171,466 B2
(45) Date of Patent: May 1, 2012

(54) HITLESS APPLICATION UPGRADE FOR SIP SERVER ARCHITECTURE

(75) Inventors: Anno R. Langen, Berkeley, CA (US); Rao Nasir Khan, Fremont, CA (US); Jaroslaw Wilkiewicz, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1323 days.

(21) Appl. No.: 11/748,767

(22) Filed: May 15, 2007
(Under 37 CFR 1.47)

(65) Prior Publication Data

US 2008/0091837 A1    Apr. 17, 2008

Related U.S. Application Data

(60) Provisional application No. 60/800,943, filed on May 16, 2006.

(51) Int. Cl.
G06F 9/44 (2006.01)
(52) U.S. Cl. .......................... 717/170; 717/168; 717/173
(58) Field of Classification Search .................. None
See application file for complete search history.

(56) References Cited

U.S. PATENT DOCUMENTS

| | | |
|---|---|---|
| 5,325,360 A | 6/1994 | Friedrich |
| 5,440,727 A | 8/1995 | Bhide et al. |
| 5,590,288 A | 12/1996 | Castor et al. |
| 5,659,596 A | 8/1997 | Dunn |
| 5,675,800 A | 10/1997 | Fisher et al. |
| 5,832,487 A | 11/1998 | Olds et al. |
| 5,941,999 A | 8/1999 | Matena et al. |
| 5,963,974 A | 10/1999 | Arimilli et al. |
| 6,012,059 A | 1/2000 | Neimat et al. |
| 6,052,724 A | 4/2000 | Willie et al. |
| 6,067,301 A | 5/2000 | Aatresh |
| 6,134,673 A | 10/2000 | Chrabaszcz |
| 6,208,870 B1 | 3/2001 | Lorello et al. |
| 6,226,686 B1 | 5/2001 | Rothschild et al. |
| 6,279,076 B1 | 8/2001 | Shishido |
| 6,292,833 B1 | 9/2001 | Liao et al. |
| 6,304,949 B1 | 10/2001 | Houlsdworth |
| 6,335,927 B1 | 1/2002 | Elliott et al. |
| 6,480,862 B1 | 11/2002 | Gall |
| 6,557,038 B1 | 4/2003 | Becker et al. |

(Continued)

OTHER PUBLICATIONS

Otso Kassinen, Group-Based Content Push with Dynamic Session Startup, MUM 2005 Christchurch, New Zealand, pp. 135-141, <http://dl.acm.org/citation.cfm?id=1149512>.*

(Continued)

*Primary Examiner* — Thuy Dao
*Assistant Examiner* — Cuong V Luu
(74) *Attorney, Agent, or Firm* — Fliesler Meyer LLP

(57) ABSTRACT

The Session Initiation Protocol (SIP) server can be comprised of an engine tier and a state tier distributed on a cluster network environment. The engine tier can send, receive and process various messages. The state tier can maintain in-memory state data associated with various SIP sessions. Various applications can be running on the engine tier. A new version of an application can be deployed alongside the old version, simultaneously running on the SIP server. Incoming messages for new calls can be directed by the SIP server to the new version of the application. Incoming messages for previously established calls can be directed to the old version of the application. Once the old version is finished processing calls, it can be undeployed.

19 Claims, 9 Drawing Sheets

U.S. PATENT DOCUMENTS

| | | |
|---|---|---|
| 6,578,076 B1 | 6/2003 | Putzolu |
| 6,611,867 B1 | 8/2003 | Bowman-Amuah |
| 6,621,793 B2 | 9/2003 | Widegren et al. |
| 6,625,705 B2 | 9/2003 | Yanai et al. |
| 6,625,751 B1 | 9/2003 | Starovic et al. |
| 6,629,260 B1 | 9/2003 | Dancer et al. |
| 6,701,519 B1 | 3/2004 | Cowan |
| 6,704,933 B1 | 3/2004 | Tanaka et al. |
| 6,708,206 B1 | 3/2004 | Thrane et al. |
| 6,721,286 B1 | 4/2004 | Williams et al. |
| 6,747,970 B1 | 6/2004 | Lamb et al. |
| 6,801,604 B2 | 10/2004 | Maes et al. |
| 6,823,477 B1 | 11/2004 | Cheng et al. |
| 6,862,689 B2 | 3/2005 | Bergsten et al. |
| 6,877,111 B2 | 4/2005 | Sharma et al. |
| 6,888,828 B1 | 5/2005 | Partanen et al. |
| 6,904,140 B2 | 6/2005 | Trossen |
| 6,961,776 B1 | 11/2005 | Buckingham et al. |
| 6,965,777 B1 | 11/2005 | Cast et al. |
| 6,988,133 B1 | 1/2006 | Zavalkovsky et al. |
| 7,039,037 B2 | 5/2006 | Wang et al. |
| 7,050,424 B2 | 5/2006 | Cheng et al. |
| 7,058,046 B2 | 6/2006 | Celi, Jr. et al. |
| 7,073,090 B2 | 7/2006 | Yanai et al. |
| 7,076,562 B2 | 7/2006 | Singhal et al. |
| 7,082,102 B1 | 7/2006 | Wright |
| 7,089,307 B2 | 8/2006 | Zintel et al. |
| 7,140,012 B2 * | 11/2006 | Pugh et al. ............. 717/170 |
| 7,142,876 B2 | 11/2006 | Trossen et al. |
| 7,149,222 B2 | 12/2006 | Wiryaman et al. |
| 7,237,239 B1 * | 6/2007 | Goel et al. ............. 717/170 |
| 7,243,351 B2 | 7/2007 | Kundu |
| 7,246,256 B2 | 7/2007 | De La Cruz et al. |
| 7,283,539 B2 | 10/2007 | Wang et al. |
| 7,292,580 B2 | 11/2007 | Ramamurthy et al. |
| 7,301,905 B1 | 11/2007 | Tontiruttananon et al. |
| 7,330,899 B2 | 2/2008 | Wong |
| 7,380,022 B2 | 5/2008 | Tell et al. |
| 7,380,073 B2 | 5/2008 | Shorb |
| 7,392,421 B1 | 6/2008 | Bloomstein et al. |
| 7,406,618 B2 | 7/2008 | Fung et al. |
| 7,464,178 B2 | 12/2008 | Corrigan et al. |
| 7,499,458 B2 | 3/2009 | McDysan et al. |
| 7,506,194 B2 | 3/2009 | Appanna et al. |
| 7,516,450 B2 * | 4/2009 | Ogura ............. 717/168 |
| 7,522,523 B2 | 4/2009 | Smallwood et al. |
| 7,529,805 B2 | 5/2009 | Martinez et al. |
| 7,554,992 B2 | 6/2009 | Kimura et al. |
| 7,606,839 B2 | 10/2009 | Aronoff et al. |
| 7,623,452 B2 | 11/2009 | Roeder |
| 7,747,995 B2 * | 6/2010 | Fritsch et al. ............. 717/168 |
| 7,813,299 B2 | 10/2010 | Yumoto et al. |
| 7,913,244 B2 * | 3/2011 | Zotter et al. ............. 717/168 |
| 2001/0030970 A1 | 10/2001 | Wiryaman et al. |
| 2002/0036983 A1 | 3/2002 | Widegren et al. |
| 2002/0039352 A1 | 4/2002 | El-Fekih et al. |
| 2002/0048269 A1 | 4/2002 | Hong et al. |
| 2002/0065034 A1 | 5/2002 | Zhang |
| 2002/0073211 A1 | 6/2002 | Lin et al. |
| 2002/0073404 A1 | 6/2002 | Sokolov et al. |
| 2002/0075844 A1 | 6/2002 | Hagen |
| 2002/0077134 A1 | 6/2002 | Mizell et al. |
| 2002/0129174 A1 | 9/2002 | LaBaw |
| 2002/0144119 A1 | 10/2002 | Benantar |
| 2002/0147749 A1 | 10/2002 | Ortiz et al. |
| 2002/0159387 A1 | 10/2002 | Allison et al. |
| 2003/0028529 A1 | 2/2003 | Cheung et al. |
| 2003/0033524 A1 | 2/2003 | Tran et al. |
| 2003/0055920 A1 | 3/2003 | Kakadia et al. |
| 2003/0093695 A1 | 5/2003 | Dutta |
| 2003/0095540 A1 | 5/2003 | Mulligan et al. |
| 2003/0120593 A1 | 6/2003 | Bansal et al. |
| 2003/0125021 A1 | 7/2003 | Tell et al. |
| 2003/0131116 A1 | 7/2003 | Jain et al. |
| 2003/0158908 A1 | 8/2003 | Jacobs et al. |
| 2003/0163761 A1 | 8/2003 | Chen et al. |
| 2003/0165135 A1 | 9/2003 | Itzkovitz et al. |
| 2003/0227894 A1 | 12/2003 | Wang et al. |
| 2003/0227926 A1 | 12/2003 | Ramamurthy et al. |
| 2004/0002881 A1 | 1/2004 | Hu et al. |
| 2004/0086102 A1 | 5/2004 | McMurray et al. |
| 2004/0116117 A1 | 6/2004 | Ahvonen et al. |
| 2004/0117794 A1 | 6/2004 | Kundu |
| 2004/0139204 A1 | 7/2004 | Ergezinger et al. |
| 2004/0148357 A1 | 7/2004 | Corrigan et al. |
| 2004/0152439 A1 | 8/2004 | Kimura et al. |
| 2004/0160911 A1 | 8/2004 | Zilliacus et al. |
| 2004/0168162 A1 | 8/2004 | Park et al. |
| 2004/0172421 A1 | 9/2004 | Saito et al. |
| 2004/0196858 A1 | 10/2004 | Tsai et al. |
| 2004/0213156 A1 | 10/2004 | Smallwood |
| 2004/0218619 A1 | 11/2004 | Salo |
| 2004/0223602 A1 | 11/2004 | Honkasalo et al. |
| 2004/0230682 A1 | 11/2004 | Immonen |
| 2004/0233866 A1 * | 11/2004 | Bossoli et al. ............. 370/328 |
| 2004/0246822 A1 | 12/2004 | Wong |
| 2004/0246947 A1 | 12/2004 | Wong |
| 2004/0258238 A1 | 12/2004 | Wong |
| 2004/0260967 A1 | 12/2004 | Guha et al. |
| 2004/0267882 A1 | 12/2004 | Whynot et al. |
| 2005/0005022 A1 | 1/2005 | Taylor |
| 2005/0022047 A1 | 1/2005 | Chandrasekaran |
| 2005/0022210 A1 | 1/2005 | Zintel et al. |
| 2005/0025050 A1 | 2/2005 | Roeder |
| 2005/0038828 A1 | 2/2005 | Kaluskar et al. |
| 2005/0038836 A1 | 2/2005 | Wang |
| 2005/0044188 A1 | 2/2005 | Nakazawa et al. |
| 2005/0044233 A1 * | 2/2005 | Cai et al. ............. 709/227 |
| 2005/0091362 A1 | 4/2005 | Shigeta et al. |
| 2005/0097367 A1 | 5/2005 | Nakazawa et al. |
| 2005/0117576 A1 | 6/2005 | McDysan et al. |
| 2005/0117602 A1 | 6/2005 | Carrigan et al. |
| 2005/0152336 A1 | 7/2005 | Bratt et al. |
| 2005/0174950 A1 | 8/2005 | Ayyagari |
| 2005/0185661 A1 | 8/2005 | Scott et al. |
| 2005/0203962 A1 | 9/2005 | Zhou et al. |
| 2005/0203994 A1 | 9/2005 | Palmer et al. |
| 2005/0207432 A1 | 9/2005 | Velez-Rivera et al. |
| 2005/0226225 A1 | 10/2005 | Shigeta |
| 2005/0237999 A1 | 10/2005 | Shores et al. |
| 2005/0259806 A1 | 11/2005 | Chang |
| 2005/0262499 A1 | 11/2005 | Read |
| 2005/0265276 A1 | 12/2005 | Takeda et al. |
| 2005/0281251 A1 | 12/2005 | Yumoto et al. |
| 2006/0002333 A1 | 1/2006 | Skog et al. |
| 2006/0010224 A1 | 1/2006 | Sekar et al. |
| 2006/0069776 A1 * | 3/2006 | Shim et al. ............. 709/225 |
| 2006/0090097 A1 * | 4/2006 | Ngan et al. ............. 714/6 |
| 2006/0109818 A1 | 5/2006 | Ramanna et al. |
| 2006/0128409 A1 | 6/2006 | Gress et al. |
| 2006/0153068 A1 | 7/2006 | Dally et al. |
| 2006/0174271 A1 | 8/2006 | Chen |
| 2006/0225108 A1 | 10/2006 | Tabassi et al. |
| 2006/0233182 A1 * | 10/2006 | Appanna et al. ............. 370/401 |
| 2006/0288086 A1 * | 12/2006 | Gopalakrishnan et al. ... 709/218 |
| 2007/0005766 A1 | 1/2007 | Singhal et al. |
| 2007/0011617 A1 | 1/2007 | Akagawa et al. |
| 2007/0091874 A1 | 4/2007 | Rockel et al. |
| 2007/0169170 A1 | 7/2007 | Shiran |
| 2007/0195779 A1 | 8/2007 | Judge et al. |
| 2007/0208862 A1 | 9/2007 | Fox et al. |
| 2007/0220302 A1 | 9/2007 | Cline et al. |
| 2007/0288915 A1 * | 12/2007 | Zotter et al. ............. 717/170 |
| 2008/0021939 A1 | 1/2008 | Dahlstedt et al. |
| 2008/0046963 A1 | 2/2008 | Grayson et al. |
| 2008/0086573 A1 | 4/2008 | Martinez et al. |
| 2008/0098117 A1 | 4/2008 | Fukuhara et al. |
| 2008/0126832 A1 | 5/2008 | Morosan et al. |
| 2008/0134165 A1 * | 6/2008 | Anderson et al. ............. 717/173 |
| 2008/0141239 A1 * | 6/2008 | Larsson et al. ............. 717/173 |
| 2008/0144630 A1 | 6/2008 | Hayashida et al. |
| 2008/0147551 A1 | 6/2008 | Connely et al. |
| 2008/0178169 A1 * | 7/2008 | Grossner et al. ............. 717/170 |
| 2008/0189421 A1 | 8/2008 | Langen et al. |
| 2008/0225835 A1 | 9/2008 | Oda et al. |
| 2008/0256257 A1 | 10/2008 | Miller et al. |

| | | | |
|---|---|---|---|
| 2008/0294731 | A1 | 11/2008 | Roy |
| 2009/0187901 | A1* | 7/2009 | Kanai ............................ 717/173 |
| 2010/0175059 | A1* | 7/2010 | Wetherly et al. .............. 717/170 |

OTHER PUBLICATIONS

Kawashima Hiroyuki, Virtual PC-Type Thin Client System, 2007 NEC technical, pp. 42-47, <http://www.nec.co.jp/techrep/en/journal/g07/n03/t070310.pdf>.*

Machtelt Garrels, Is Linux Voice over IP Ready?, Linux Journal archive vol. 2006 Issue 145, May 2006, 10 pages <http://dl.acm.org/citation.cfm?id=1134166>.*

Wenyu Jiang, Towards Junking the PBX: Deploying IP Telephony, 2001 ACM 1-58113-370-7/01/0006, pp. 177-185, <http://dl.acm.org/citation.cfm?id=378344.378369>.*

KK Tan, Session Initiation Protocol, 0-7803-7657-9/02 2002 IEEE, pp. 1310-1314, <http://ieeexplore.ieee.org/stamp/stamp.jsp?tp=&arnumber=1189367>.*

Hua Zou, Prototyping SIP-based VoIP Services in Java, 0-7803-6394-9/00 2000 IEEE, pp. 1395-1399, <http://ieeexplore.ieee.org/stamp/stamp.jsp?tp=&arnumber=890924>.*

Fasel et al., "The FOKUS Open SIP AS—A Service Platform for NGN," Mar. 2005, IN Proceedings Kommunikation in Verteilten Systemen (KiVS), pp. 49-56.

Olsen et al., Sip Servlet Discussion, 2003, org.apache.tomcat.dev listserv archives; pp. 1-5, retrieved at http://markmail.org/search/?q=sip+servlet+httpsession+date%3A199811-200605 on Nov. 3, 2010.

Kristensen, A., "SIP Servlet API Version 1.0," Internet article [online], Feb. 4, 2003, http://jcp.org/en/jsr/detail?id=116> [retrieved on Mar. 6, 2009], p. 1-section 1, p. 4-section 1.4.2, 120 pages.

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6, 8 pages.

BEA Systems, Inc., BEA WebLogic SIP Server: Configuring and Managing WebLogic SIP Server, Dec. 2, 2005, BEA Systems, Inc., Version 2.1, pp. 4-13, 202 pages.

Zhuang et al., Policy Based QoS Architecture in the IP Multimedia Subsystem of UMTS, IEEE Network, May/Jun. 2003, pp. 51-57.

International Search Report and Written Opinion for PCT/US07/69021 dated Jul. 25, 2008, 10 pages, 12 pages.

International Search Report and Written Opinion for PCT/US07/69023 dated Aug. 25, 2008, 8 pages.

Magedanz et al., The IMS Playground @ FOKUS—An Open Testbed for Generation Network Multimedia Services, Feb. 23-25, 2005, pp. 1, 6, 10 pages.

International Search Report and Written Opinion for PCT/US06/11429 dated Aug. 7, 2007, 7 pages.

International Search Report and Written Opinion for PCT/US06/11165 dated Oct. 22, 2007, 7 pages.

Coward et al., Java Servlet Specification v2.4, Nov. 24, 2003, pp. 1-330.

Kristensen et al., SIP Servlet API v1.0, Feb. 4, 2003, pp. 2-3, 5-120.

Rosenberg et al., Best Current Practices for Third Party Call Control in the SIP, Apr. 2004, Network Working Group, RFC 3725, pp. 1-32.

Supplementary European Search report for European Application No. EP 06739796, dated Mar. 19, 2009.

* cited by examiner

HITLESS APPLICATION UPGRADE FOR SIP SERVER ARCHITECTURE

CLAIM OF PRIORITY

The present application claims the benefit of U.S. Provisional Patent Application No. 60/800,943, entitled HITLESS APPLICATION UPGRADE FOR SIP SERVER ARCHITECTURE, by Anno R. Langen et al., filed on May 16, 2006, which is incorporated herein by reference in its entirety.

CROSS REFERENCE TO RELATED APPLICATIONS

The following commonly owned, co-pending U.S. patents and patent applications, including the present application, are related to each other. Each of the other patents/applications are incorporated by reference herein in their entirety:

U.S. patent application Ser. No. 11/378,188, entitled SYSTEM AND METHOD FOR MANAGING COMMUNICATIONS SESSIONS IN A NETWORK, by Reto Kramer et al., filed on Mar. 17, 2006;

U.S. patent application Ser. No. 11/384,056, entitled SYSTEM AND METHOD FOR A GATEKEEPER IN A COMMUNICATIONS NETWORK, by Reto Kramer et al., filed on Mar. 17, 2006;

U.S. Provisional Patent Application No. 60/801,091 entitled SIP AND HTTP CONVERGENCE IN NETWORK COMPUTING ENVIRONMENTS, by Anno R. Langen et al., filed on May 16, 2006;

U.S. Provisional Patent Application No. 60/801,083 entitled ENGINE NEAR CACHE FOR REDUCING LATENCY IN A TELEOMMUNICATIONS ENVIRONMENT, by Anno R. Langen et al., filed on May 16, 2006;

U.S. Patent Application No. 11/434,022 entitled SYSTEM AND METHOD FOR CONTROLLING DATA FLOW BASED UPON A TEMPORAL POLICY, by Narendra Vemula et al., filed on May 15, 2006;

U.S. patent application No. 11/434,024 entitled SYSTEM AND METHOD FOR CONTROLLING ACCESS TO LEGACY PUSH PROTOCOLS BASED UPON A POLICY, by Bengt-Inge Jakobsson et al., filed on May 15, 2006;

U.S. patent application No. 11/434,010 entitled SYSTEM AND METHOD FOR CONTROLLING ACCESS TO LEGACY MULTIMEDIA MESSAGE PROTOCOLS BASED UPON A POLICY, by Andreas E. Jansson, filed on May 15, 2006;

U.S. patent application No. 11/434,025 entitled SYSTEM AND METHOD FOR CONTROLLING ACCESS TO LEGACY SHORT MESSAGE PEER-TO-PEER PROTOCOLS BASED UPON A POLICY, by Andreas E. Jansson, filed on May 15, 2006;

U.S. patent application No. 11/432,934 entitled SYSTEM AND METHOD FOR SHAPING TRAFFIC, by Jan Thomas Svensson, filed on May 12, 2006.

COPYRIGHT NOTICE

A portion of this disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD OF INVENTION

The current invention relates generally to managing telecommunications and more particularly to upgrading applications within a network environment.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. Furthermore, latency and migration of services have become important issues in addressing the processing of telecommunications, as more and more users expect seemingly instantaneous and uninterrupted access to their devices.

DETAILED DESCRIPTION

Figure 1A:
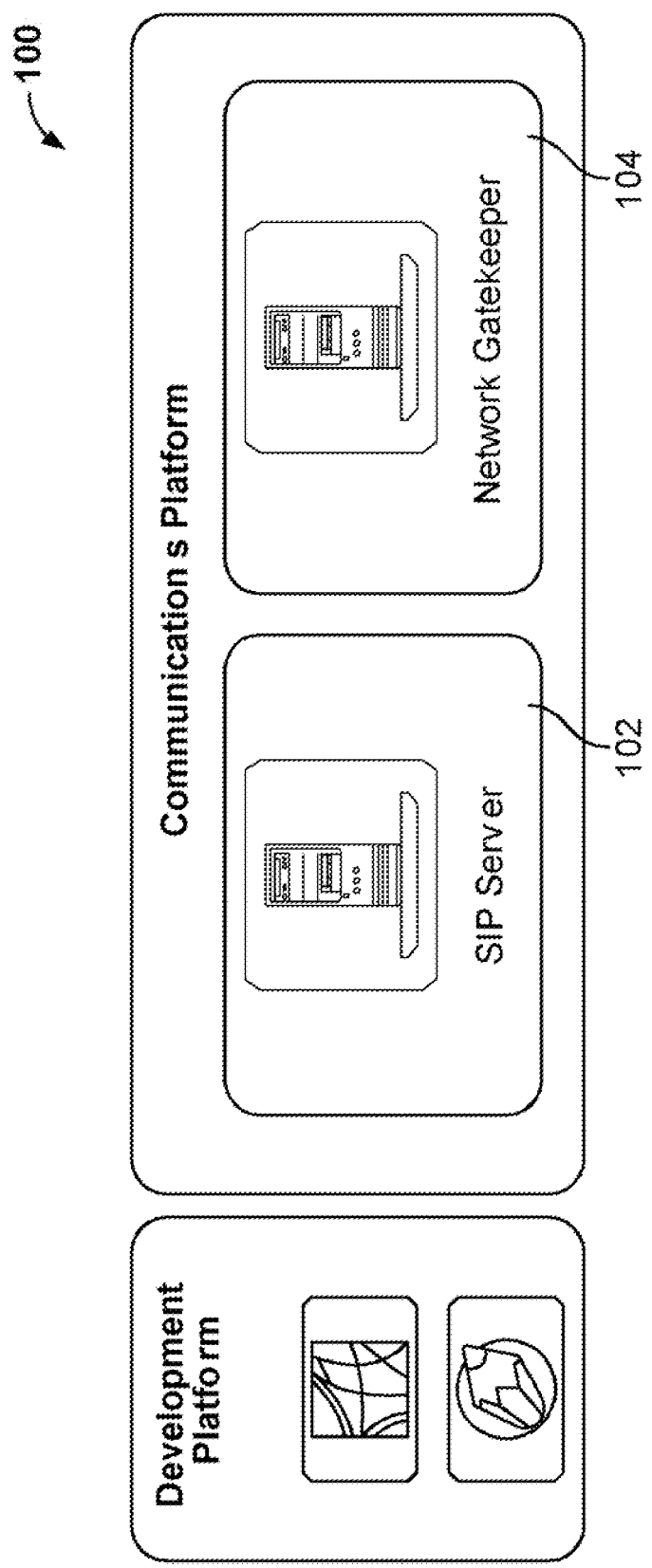
FIG. 1A is an exemplary illustration of a functional system layers in various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there is provided a hitless application upgrade for a session initiation protocol (SIP) server architecture. A SIP server can be comprised of an engine tier and a state tier distributed on a cluster network environment. The engine tier can include a set of engine nodes that send, receive and process various messages. The state tier can include a set of state tier replica nodes that maintain in-memory state data associated with various SIP sessions. Applications can be deployed and executed on the engine tier. These applications can be adapted to process telecommunication sessions, data and calls such as via the SIP protocol. In certain embodiments, an application may need to be upgraded or modified such as by re-compiling and re-deploying the application onto the engine tier.

In one embodiment, a new version of an application can be deployed alongside an old version, which is simultaneously running on the SIP server. Subsequently, incoming messages for new calls can be directed by the SIP server to the new version of the application. Incoming messages for previously established calls can be directed to the old version of the application. In one embodiment, once the old version has completed processing all of its calls, it can be un-deployed. In this manner, an application can be upgraded to a new version without affecting any existing call processing.

FIG. 1A is an exemplary illustration of functional system layers in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A Session Initiation Protocol (SIP) Server 102 and a Network Gatekeeper 104 can comprise a portfolio of products that collectively make up the Communications Platform 100. The SIP Server 102 provides the Communications Platform 100 with a subsystem in which application components that interact with SIP-based networks may be deployed. The Network Gatekeeper 104 provides a policy-driven telecommunications Web services gateway that allows granular control over access to network resources from un-trusted domains.

Figure 1B:
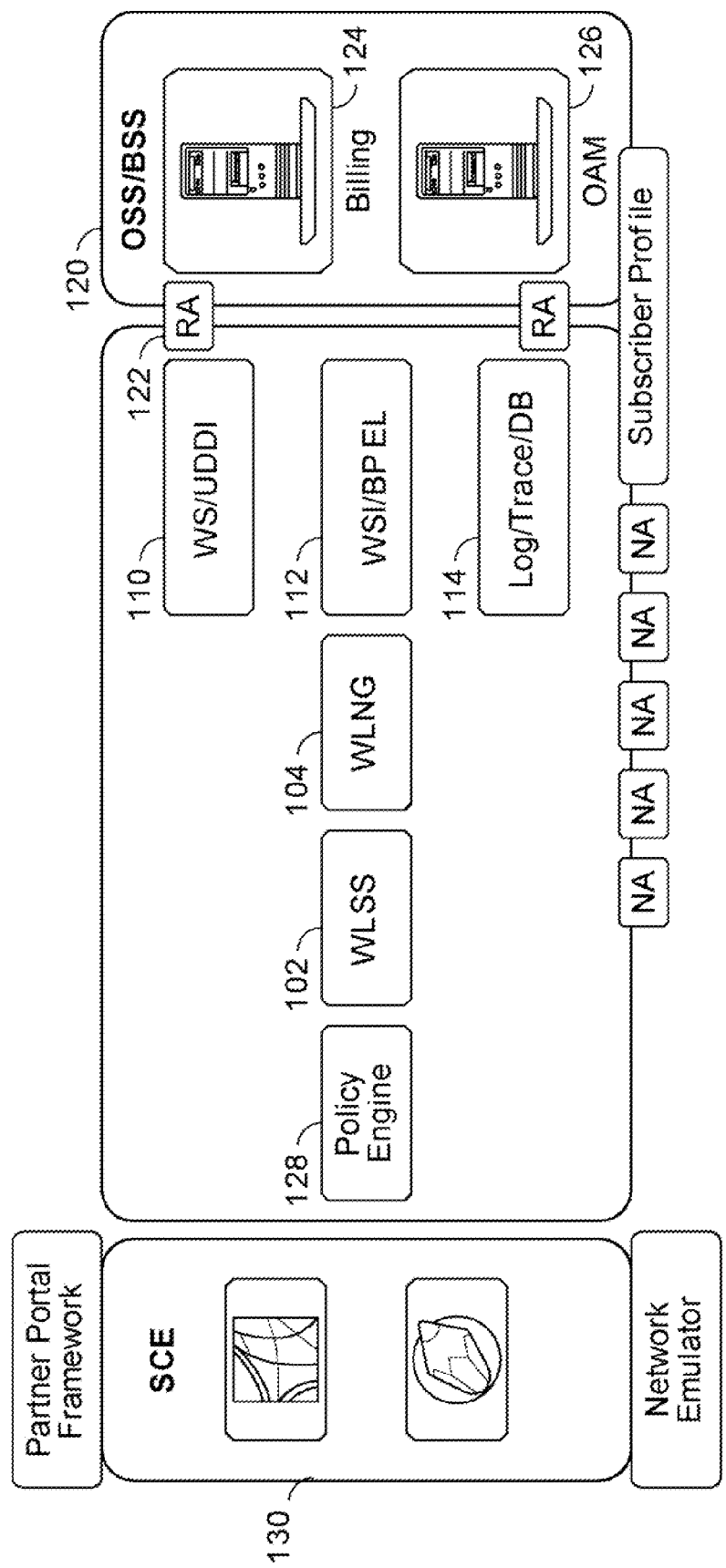
FIG. 1B is another exemplary illustration of functional system layers in a communications platform embodiment.

A variety of shared and re-usable software and service infrastructure components comprise the Communications Platform 100. For example, an Application Server, such as the WebLogic™ Application Server by BEA Systems, Inc. of San Jose, Calif. This Application Server may be augmented and adapted for deployment in telecommunications networks, while providing many features and functionality of the WebLogic Server counterpart widely deployed in enterprise computing environments. Application Server embodiments for use in the telecommunications applications can provide a variety of additional features and functionality, such as without limitation:

Optimized for Peak Throughput
 Clustering for Scalability and High-Performance
 Generalized for wide range of target platforms (HW/OS) support
 Extensive deployment configuration options
 Optimized for local management
 Plug and play Enterprise Information Systems (EIS) support Analogously, communications platform embodiments can provide a variety of additional features and functionality, such as without limitation:

Highly Deterministic Runtime Environment
 Clustering for High-Availability (HA) and Scalability
 Optimized for Telecom HW/OS/HAM W platforms support (SAF, ATCA, HA M/W, etc.)
 Hardened configuration
 Optimized for Telecom NMS integration
 Telecommunications network connectors and interfaces
 Partitioning, replication and failover FIG. 1B is another exemplary illustration of functional system layers in a communications platform embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Communications platform 100 comprises a SIP Server (WLSS) 102 and a Network Gatekeeper (WLNG) 104. Tools for interacting with Web Services, such as a Web Service—Universal Description Discovery Interface (WS/UDDI) 110, a Web Service—Business Process Execution Language (WS/BPEL) 112 may be coupled to the SIP Server 102 and the Network Gatekeeper 104 in embodiments. A log/trace and database 114 can assist with troubleshooting. In some deployments, the Communications Platform 100 can interface with an OSS/BSS system 120 via resource adapters 122. Such interfaces can provide access to billing applications 124, Operation, Administration, and Maintenance (OAM) applications 126 and others. A policy engine 128 can control the activities of the above-described components which can be implemented in a scalable cluster environment (SCE) 130.

A Communications Platform embodiment can provide an open, high performance, software based fault-tolerant platform that allows operators to maximize revenue potential by shortening time to market and significantly reducing per-service implementation and integration cost and complexity. The Communications Platform is suitable for use by for Network Infrastructure Vendor, Network Operators and Communications Service Providers in multiple deployment scenarios ranging from fully IMS oriented network architectures to hybrid and highly heterogeneous network architectures. It is not restricted to use only in carrier networks, however, and may be deployed in Enterprise communications networks without restriction or extensive customization. When deployed in conjunction with an IP Multimedia Subsystem, the Communications Platform can serve in the role of an IMS SIP Application Server and offers Communications Service Providers an execution environment in which to host applications (such as the WebLogic Network Gatekeeper), components and standard service enablers.

Figure 1C:
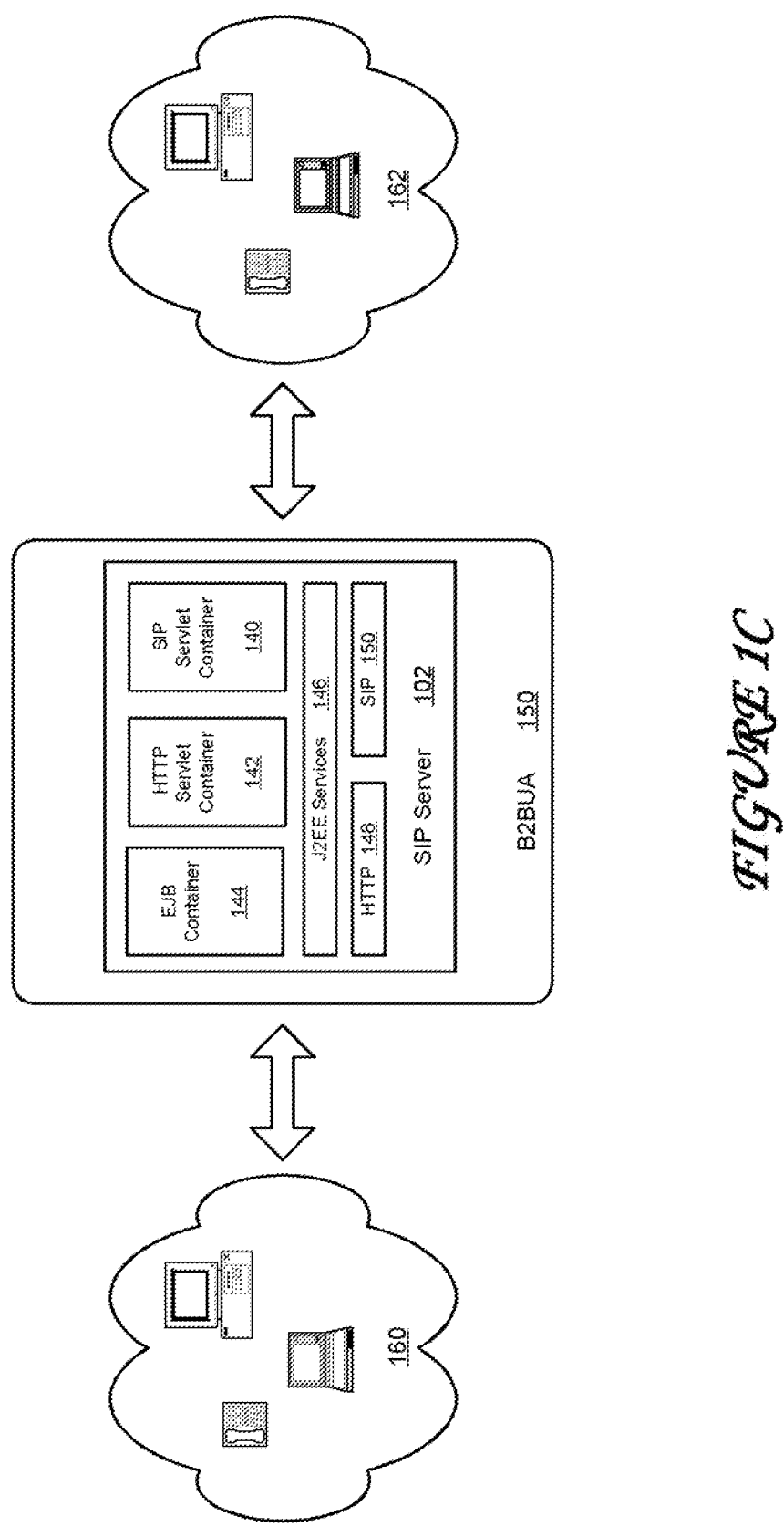
FIG. 1C is an exemplary illustration of a SIP server deployed in a production environment, in accordance with various embodiments.

FIG. 1C is an exemplary illustration of a SIP server deployed in a production environment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the SIP server 102 can be used as a back-to-back user agent (B2BUA) 150 in a typical telecommunications environment. A B2BUA can take the place of an intermediary between communications between user agents 160, 162, including various cellular phones, wireless devices, laptops, computers, applications, and other components capable of communicating with one another electronically. The B2BUA 150 can provide multiple advantages, including controlling the flow of communication between user agents, enabling different user agents to communicate with one another (e.g. a web application can communicate with a cellular phone), as well as various security advantages. As an illustration, the user agents can transmit to the SIP server instead of communicating directly to each other and thus malicious users can be prevented from sending spam and viruses, hacking into other user agent devices, and otherwise compromising security.

The SIP server 102 can be implemented as a Java Enterprise Edition application server that has been extended with support for the session initiation protocol (SIP) as well as other operational enhancements that allow it to meet the demanding requirements of the next generation protocol-based communication networks. In one embodiment, the SIP server 102 can include an Enterprise Java Beans (EJB) container 144, a Hyper Text Transfer Protocol (HTTP) servlet container 142, an SIP servlet container 140, various Java 2 Enterprise Edition (J2EE) services 146, and SIP 150 and HTTP 148 components. The SIP stack of the server can be fully integrated into the SIP servlet container 140 and can offer much greater ease of use than a traditional protocol stack. A SIP servlet Application Programming Interface (API) can be provided in order to expose the full capabilities of the SIP protocol in the Java programming language. The SIP servlet API can define a higher layer of abstraction than simple protocol stacks provide and can thereby can free up the developer from concern about the mechanics of the SIP protocol itself. For example, the developer can be shielded from syntactic validation of received requests, handling of transaction layer timers, generation of non application related responses, generation of fully-formed SIP requests from request objects (which can involve correct preparation of system headers and generation of syntactically correct SIP messages) and handling of lower-layer transport protocols such as TCP, UDP or SCTP.

In one embodiment, the container is a server software that hosts applications (i.e. contains them). In the case of a SIP container, it hosts SIP applications. The container can perform a number of SIP functions as specified by the protocol thereby taking the burden off the applications. At the same time, the SIP container can expose the application to SIP protocol messages (via the SIP Servlet API) on which applications can perform various actions. Different applications can thus be coded and deployed to the container that provides various telecommunication and multimedia services.

Figure 2:
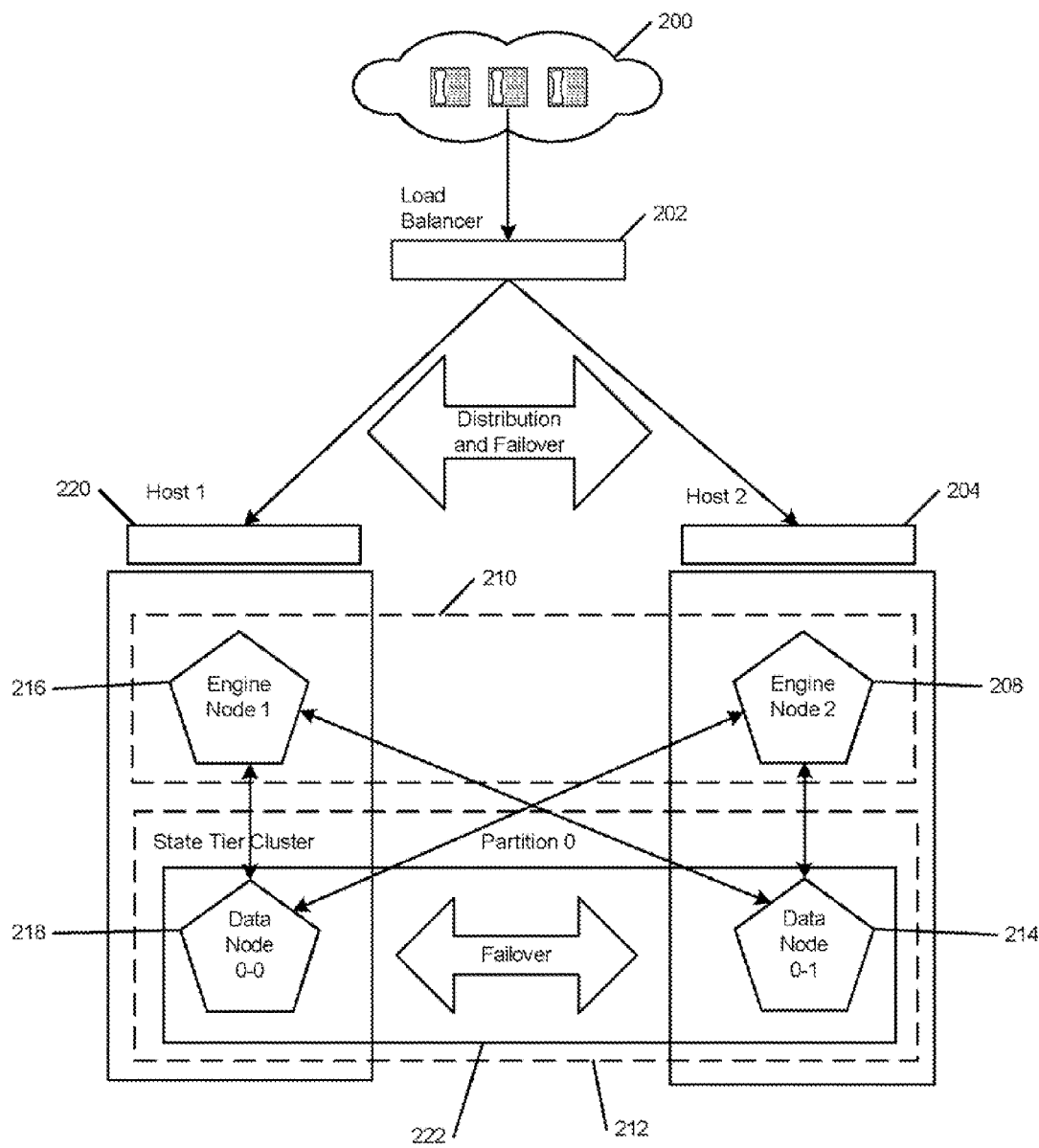
FIG. 2 is an exemplary illustration of the SIP server cluster architecture in accordance with various embodiments of the invention.

FIG. 2 is an exemplary illustration of the SIP server cluster architecture in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means. For example, while the FIG. 2 shows Host A implementing both an engine node and a data node, this should not be construed as limiting the invention. In many cases, it can be preferable to distribute the engine node and data node onto separate host machines. Similarly, while FIG. 2 illustrates two host machines, it is possible and even advantageous to implement many more such hosts in order to take advantage of distribution, load balancing and failover that such a system can provide.

As illustrated, a message, such as a phone call request or some other transfer of data associated with SIP, can come into the cluster from the internet (such as over VoIP), phone, or some other type of network 200. This message can be received and handled by a load balancer 202 which can be responsible distributing message traffic across the engines (such as engine node 1 216 and engine node 2 208) in the cluster. The load balancer can be a standard load balancing appliance hardware device and it is not necessary that it be SIP aware; there is no requirement that the load balancer support affinity between the engines 216, 208, and SIP dialogs or transactions. However in alternative embodiments, certain advantages may be obtained by implementing a SIP-aware load balancer, as discussed in further detail below. Alternatively, the load balancer can be implemented as software that distributes the messages to the various engines. In the various embodiments, the primary goal of the load balancer 202 can be to provide a single public address that distributes incoming SIP requests to available servers in the SIP server engine tier 210. Such distribution of requests can ensure that the SIP server engines are fully utilized. The load balancer 202 can also be used for performing maintenance activities such as upgrading individual servers or applications without disrupting existing SIP clients.

In one embodiment, the SIP server can provide a two-tier cluster architecture model to handle the incoming messages. In this model, a stateless engine tier 210 can process all signaling traffic and can also replicate transaction and session state to the state tier 212 and its partitions 222. Each partition 222 can consist of any number of nodes (replicas) 218, 214 distributed across any number of hosts such as host 1 220 and host 2 204 which can be implemented as computers linked in a cluster type network environment. The state tier 212 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

The engine tier 210 can be implemented as a cluster of SIP server instances that hosts the SIP servlets which provide various features to SIP clients. In one embodiment, the engine tier 210 is stateless, meaning that most SIP session state information is not persisted in the engine tier, but is obtained by querying the state tier 212 which can in turn provide replication and failover services for SIP session data. In alternative embodiments, the engine tier can have state maintained in a local near cache for improving latency.

The primary goal of the engine tier 210 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier 212 can be implemented as a cluster of SIP server instances that provides a high-performance, highly-available, in-memory store for maintaining and retrieving session state data for SIP servlets. This session data may be required by SIP applications in the SIP server engine tier 210 in order to process incoming messages. Within the state tier 212, session data can be managed in one or more partitions 222, where each partition manages a fixed portion of the concurrent call state. For example, in a system that uses two partitions, the first partition could manage one half of the concurrent call state (e.g. A-M) and the second partition can manage the other half (e.g. N-Z). With three partitions, each can manage a third of the call state and so on. Additional partitions can be added as needed to manage large number of concurrent calls.

In one embodiment, within each partition 222, multiple servers can be added to provide redundancy and failover should the other servers in the partition fail. When multiple servers participate in the same partition 222, those servers can be referred to as replicas because each server maintains a duplicate copy of the partition's call state. For example, nodes 218 and 214 of the partition 222 can be implemented as replicas. Furthermore, to increase the capacity of the state tier 212, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas 214, 218 can join and leave the partition 222 and each replica can serve as exactly one partition at a time. Thus, in one embodiment, the total available call state storage capacity of the cluster is a summation of the capacities of each partition 222.

In one embodiment, each partition 222 can peer-replicated, meaning that clients perform all operations (reads/writes) to all replicas 218, 214 in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better failover characteristics as well, since there does not need to be change propagation delay.

In one embodiment, the engine nodes 208, 216 can be responsible for executing the call processing. Each call can have a call state associated with it. This call state can contain various information associated with the call, such as the ids of the caller/callee, where the caller is, what application is running on the callee, any timer objects that may need to fire in order to process the call flow (as discussed below), as well as any other data that may correlate to a call or a message. The state for each call can be contained in the state tier 212. The engine tier 210, on the other hand, could be stateless in order to achieve the maximum performance. In alternative embodiments, however, the engine tier can have certain amounts of state data stored thereon at various times.

In one embodiment, a typical message processing flow can involve locking/getting the call state, processing the message and then putting/unlocking the call state. The operations supported by the replicas for normal operations can include:

lock and get call state
  put and unlock call state
  lock and get call states with expired timers In various embodiments, the engine tier can maintain mainly short lived objects and any long lived objects which may be needed for message processing can be stored on the state tier. This can provide improvements in latency during garbage collection. As an illustration, the Java Virtual Machine (JVM) garbage collector can safely and quickly remove the short lived objects from memory without interfering with the execution of various other threads which may be in the process of executing. The longer lived objects, on the other hand, are not as easily removed by the garbage collector (since they may be referenced and depended on by various entities) and thus in some cases, the JVM garbage collector may need to stop processing all threads in order to safely perform its garbage collection. This is due in part to the scoping of the short lived and long lived objects. Short lived objects typically exist in a different (more localized) memory scope than the long lived objects, which may be referenced by more entities. Thus, it can be more difficult for garbage collectors to ensure that every executing entity has finished using the long lived objects and various threads are usually stopped in order to perform their regular garbage collection. This can introduce latency.

In order to deal with such issues, the engine tier can maintain mostly short lived objects. In cases where longer lived objects are needed by the engine tier, they can be retrieved from the state tier, used as short lived objects in the engine tier, and subsequently pushed back to the state tier. This can be advantageous in that garbage collection can cause lesser interference with thread execution in the engine tier.

In various embodiments, the state tier 212 can maintain call state in various data objects residing in the random access memory (RAM) of a computer. This can provide significant access speed advantages to the engine tier 210 over the use of a database. Alternatively, if latency is not an issue, call state can be maintained in a database or some other form of persistent store, which can be accessed (albeit slower) by the engine tier. State of various applications running on the SIP server can also be maintained on the state tier. Developers can be provided an API to allow their applications to access the state tier and to store various data thereon for later access by various applications. Alternatively, application state may be stored in a database.

Hitless Application Upgrade

The SIP server can deploy and host a multitude of applications that provide various services to SIP clients. For example, a webex application can be deployed on the SIP server and provide web conferencing and video conferencing features to numerous customers. Other such applications can also be running on the SIP server at various times.

In many cases, a user may wish to upgrade the SIP server or the applications running thereon with corresponding new versions, in order to add desired functionality and improve performance. However, for most large corporations or telecommunication providers which are hosting high numbers of SIP applications with very large numbers of users, it may be impractical or even impossible to find a period of time when no customers are using the system, during which time such upgrades can be added. Therefore it may be desirable to provide the SIP server with a more dynamic approach to upgrading applications and services, without interrupting the current calls or services and without disrupting the business flow of the organization.

The hitless application upgrade can enable the SIP server to upgrade a deployed SIP application to a newer version without losing the existing calls being processed by the application. This type of upgrade can be accomplished by deploying a newer application version alongside the older version which is already running on the engine tier. The SIP server can then automatically manage the calls and messages such that new calls are routed to the new version of the application, while the old established calls continue to be processed by the older version. Once all established calls are completed, the older version of the application can be undeployed. The hitless application upgrade can also enable the user to commit or roll back the changes caused by the new versions of the applications. In this manner, a smoother and more dynamic transition is provided for upgrading the various services of a corporation.

Figure 3A:
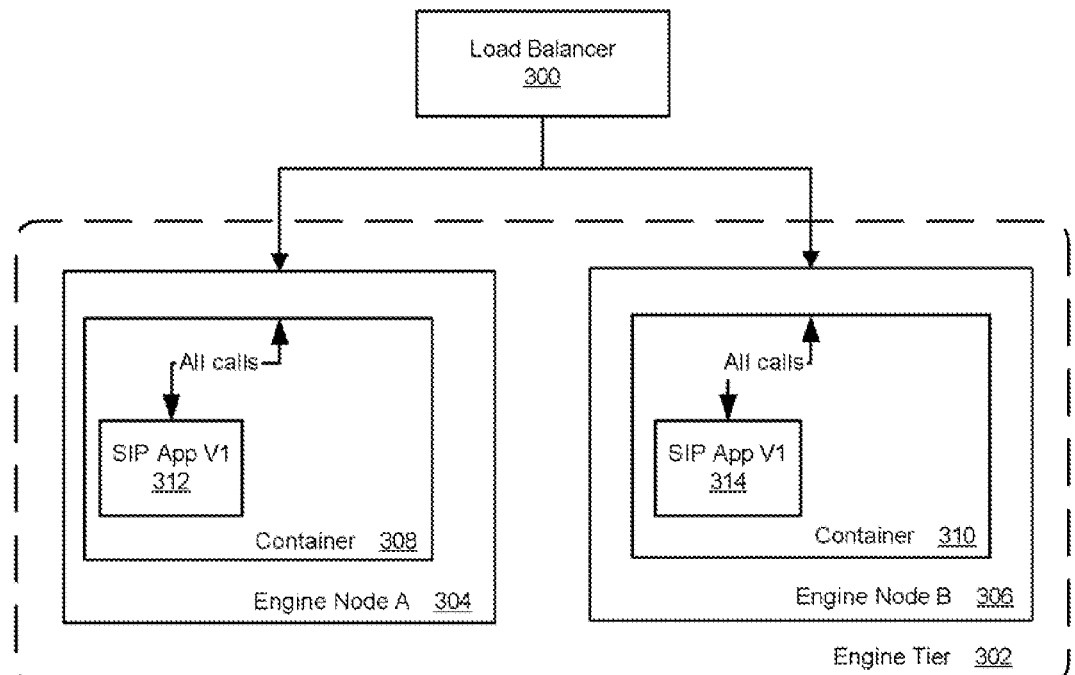
FIG. 3A is an exemplary illustration of hitless application upgrade functionality, in accordance with various embodiments of the invention.
Figure 3B:
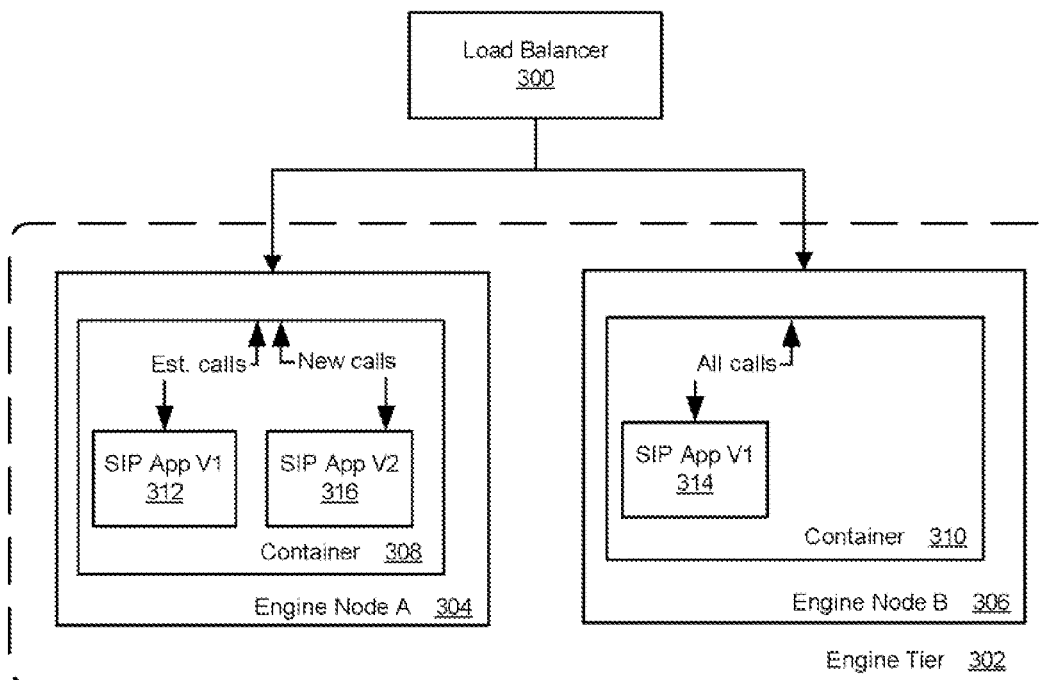
FIG. 3B is an exemplary illustration of hitless application upgrade functionality, in accordance with various embodiments of the invention.

FIGS. 3A-3B are exemplary illustrations of the hitless application upgrade functionality, in accordance with various embodiments of the invention. Although each of these diagrams depicts components as logically separate, such depiction is merely for illustrative purposes. It will be apparent to those skilled in the art that the components portrayed in these figures can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated in FIG. 3A, a SIP server including a SIP servlet container 308, 310 can be running on various engine nodes 304, 306 and having a deployed SIP application thereon, such SIP App v1 312, 314. A load balancer 300 can be receiving incoming SIP message traffic and distributing that traffic to the various engine nodes 304, 306 for processing in the engine tier 302. Some (or all) of the messages and requests received by the engine nodes, can then be directed to be handled by the SIP App v1 312, 314.

In various embodiments, a system administrator of the SIP server may wish to upgrade or substitute a new version of SIP App V1 312 without disrupting the existing calls being handled thereby. The hitless application upgrade can take enable such features, as illustrated in FIG. 3B.

In one embodiment, a new version of the SIP application, such as SIP App v2 (version two) 316, can be deployed on the engine node A 304 alongside the old version SIP App v1 312. The SIP server can then manage the SIP servlet mapping such that new requests are directed to the new version while subsequent messages for older, established dialogues are directed to the older application version until the calls complete. When all of the older dialogues have completed and the SIP App v1 312 is no longer processing calls, it can be safely undeployed. This type of a system can ensure that no calls are dropped during the upgrades of various production applications. In alternative embodiments, all old calls can be ended and new calls can be directed to the new application version.

Version information can be assigned to each updated application in order to distinguish it from the older application versions. For example, whenever a SIP application is deployed, a version number can be associated therewith. Alternatively, only new updated applications may be assigned a version number and other applications that are already deployed may be assumed to be older versions by the SIP server. In cases where the application hard-codes the use of an application name (e.g. in composed applications where multiple SIP servlets process a given call), the application name can be replaced with calls to a helper method that obtains the base application name. For example, the SIP server can provide SipApplicationRuntimeMBean methods for obtaining the base application name and version identifiers as well as for determining whether the current application version is active or retiring.

The SIP server can use a version identifier such as a string value appended to the application name in order to distinguish between multiple versions of a given application. For example, the version can be appended to the context root or to the archive name when the application is packaged for deployment. The SIP server can subsequently strip the version string specified from the application's deployment name so that it can recognize when several versions of the same application are deployed. If two versions are indeed deployed, the server can begin routing new requests to the most recently-deployed application. The server can allow the other deployed application to complete in-flight calls while directing no new calls to it. This process can be referred to as retiring because eventually, the older version will process no SIP messages. The server can also distinguish between a deployment that has no version identifier and a subsequent version that does specify a version identifier. This can enable upgrades of applications that were packaged before version information was used on the SIP server.

As illustrated in FIG. 3B, after deploying the new version of the existing application, it can be activated to process new calls. This can be done by the SIP server replacing existing servlet mappings for the application being upgraded with new servlet mappings specified in the SIP deployment descriptor of the new version. The original deployment SIP App v1 312 can then process messages only for established or in-flight calls (e.g. calls that were initiated with the original deployment). After these in-flight calls are completed, the original deployment version can be removed as no longer being necessary. In order to determine whether a deployed application is processing messages, an active session count can be obtained from the application's runtime bean instance or a script prepared by a system administrator. When the count of active sessions for that version of the application reaches zero, the hitless application upgrade can be gracefully committed by removing the old version. For example, a method "getActiveVersionState( )" can return an integer value that describes the state of a selected application version. A returned value of zero can indicate that the particular version of the application is inactive, meaning that the application is being retired. Alternatively, it can mean that this version has not yet been activated.

A graceful commit may involve letting the old version application finish routing messages to established calls before it is undeployed. In alternative embodiments, an ungraceful commit may also be implemented by terminating all existing calls and forcing all new calls to be directed to the new version. While less customer-friendly, this option may still be useful for dealing with unwanted calls, security compromises or other undesirables within an organization.

Each host or engine node can be hitlessly upgraded one at a time, in order to test the performance of the new application version without disrupting the entire system. Alternatively, all engine nodes can be upgraded in parallel, sequentially or some may be left with older application versions. Furthermore, rollback functionality can also be implemented for the SIP server. For example, if after deploying the new version of the application, the system is not performing as expected, the new version can be undeployed and new calls can be routed to the old version that was previously handling only established in-flight calls. Upon such undeployment of the new application version, the SIP server can restore the previous servlet mappings, as previously discussed.

In various embodiments, a configured load balancer 300 can be used to perform a live upgrade of the SIP server software or a deployed SIP application on a production installation. When updating the SIP server or when upgrading a SIP servlet where the servlet's session data is incompatible with the older version, a new engine tier can be created in order to host newly-upgraded engine tier instances or new versions of SIP servlets. Subsequently, servers in the engine tier can be shut down, upgraded and then restarted in the new target cluster. In some cases, it may be preferable to shut down each server one at a time so as to maintain current call processing. Similarly, it may be preferable to target all deployed SIP servlets to the engine tier cluster, rather than to individual managed server instances within the cluster. After all servers have been upgraded, the older cluster can be removed and no longer used. When the engine tier cluster is finished upgrading, servers in the state tier can be upgraded similarly one at a time.

Figure 4A:
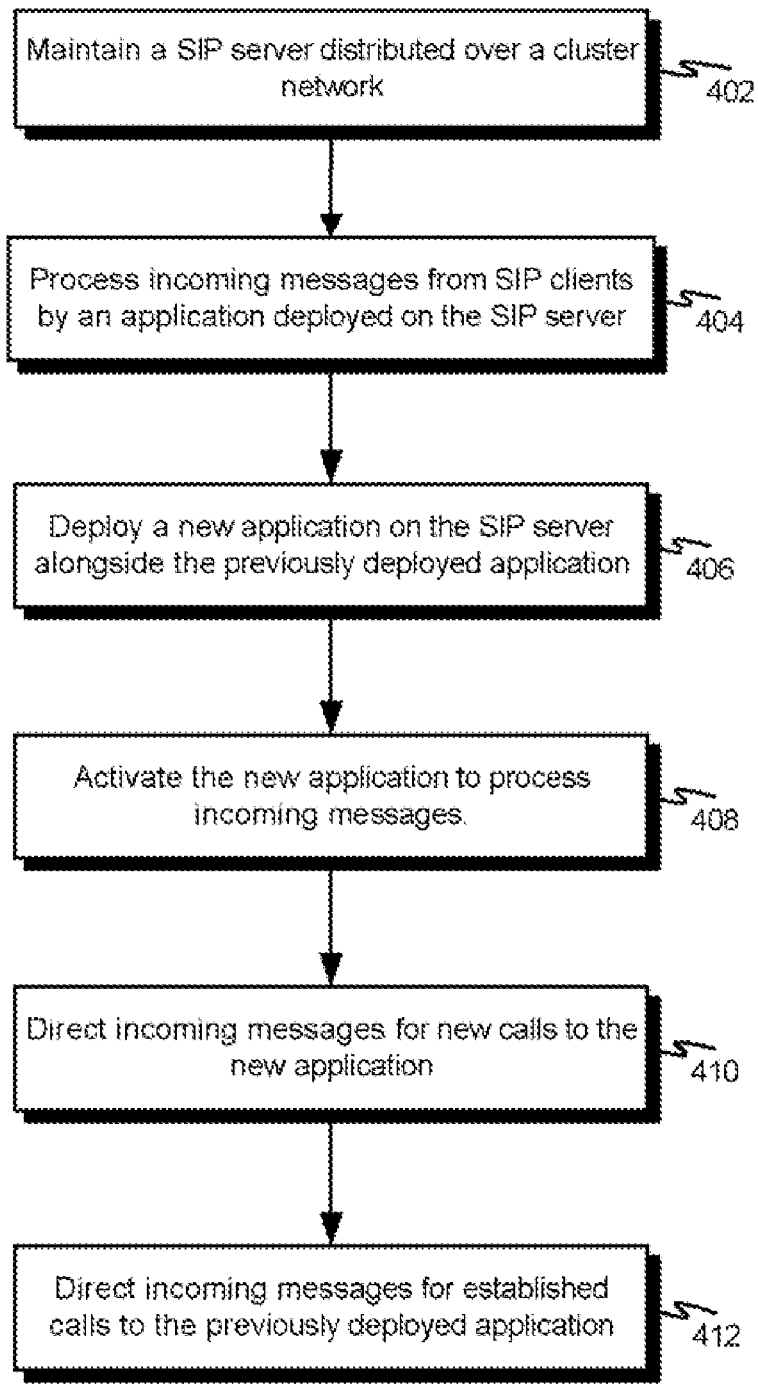
FIG. 4A is an exemplary flow diagram of the hitless application upgrade, in accordance with various embodiments.

FIG. 4A is an exemplary flow diagram of the hitless application upgrade, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 402, a SIP server can be distributed over a cluster type network in order to provide services to various SIP clients. An application deployed on the SIP server can process incoming message traffic from the SIP clients, as illustrated in step 404. A new version of the application can be deployed on the SIP server, alongside the existing version of the application, in step 406. The new version can be activated in order to begin processing calls, as illustrated in step 408. As shown in step 410, the SIP server (or the SIP servlet container therein) can direct the incoming messages for new calls to the new version of the application. Meanwhile, as illustrated in step 412, the container can direct incoming messages for previously established calls to the old version of the application. Thus, for at least some period of time, the two versions can be running simultaneously.

Figure 4B:
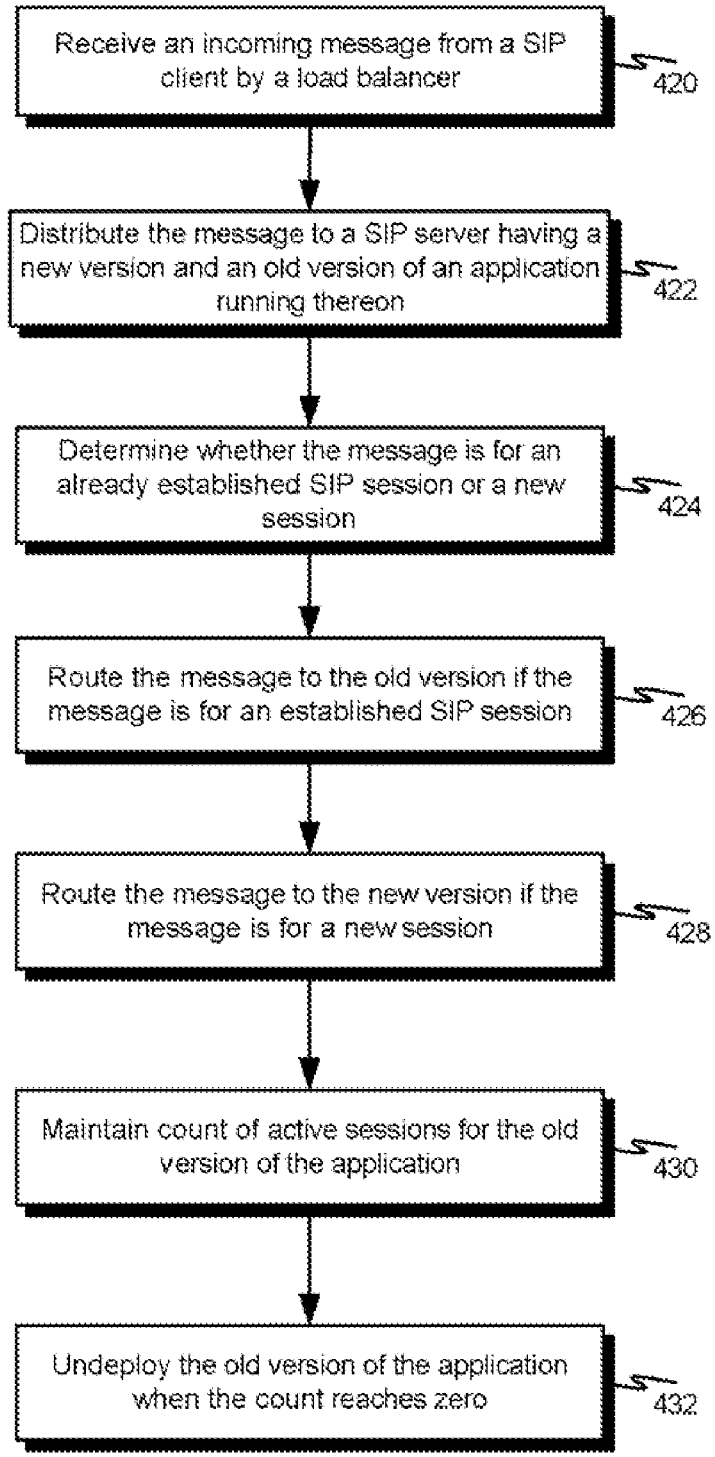
FIG. 4B is another exemplary flow diagram of the hitless application upgrade, in accordance with various embodiments.

FIG. 4B is another exemplary flow diagram of the hitless application upgrade, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 420, an incoming message can be received from a SIP client by a load balancer of the cluster network. In step 422, the load balancer can then distribute the message to a SIP server having two versions of the application running, as previously discussed. In step 424, the container can then determine whether the message is for an already established SIP session or whether the message is a request that would establish a new SIP session between the client and the SIP server.

As illustrated in step 426, the SIP server can route messages for previously established SIP sessions to the old version of the application that is executing alongside the new version on the SIP server. The messages for new SIP sessions, on the other hand can be routed to the new version, as illustrated in step 428. This can be achieved by the SIP server replacing the existing servlet mappings for the application being upgraded with new servlet mappings specified in the SIP deployment descriptor of the new version, upon deployment of the new application version.

In step 430, an active session count can be maintained, such as by the SIP server itself or via scripts implemented by a system administrator. The count is likely to decrement as existing calls (that are being handled by the old version of the application) are ended by various SIP clients. Whenever this active session count reaches zero, the new version deployment can be gracefully committed, as illustrated in step 432, by undeploying the old version of the application. All incoming traffic is then directed to the new version of the application. In this manner, no interruption in calls need be experienced by the SIP server.

Figure 4C:
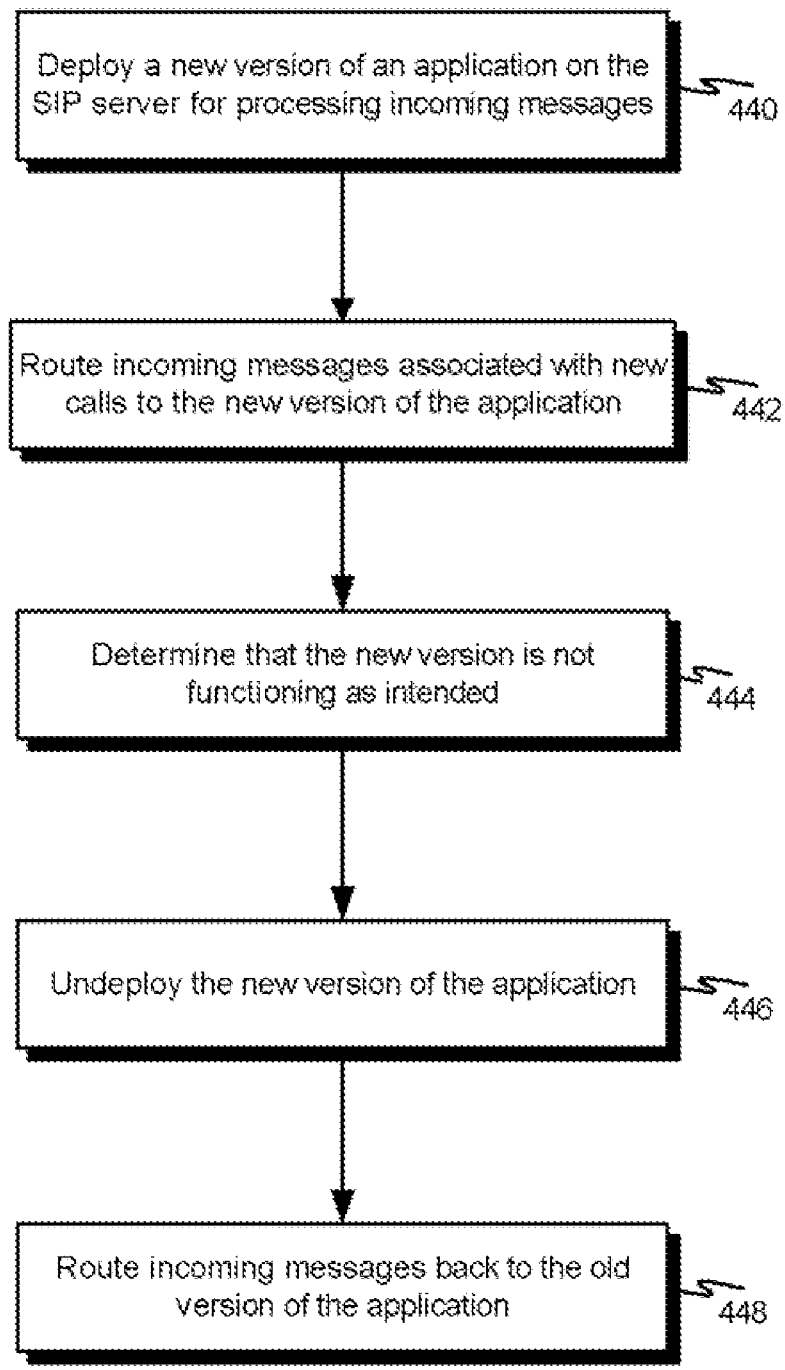
FIG. 4C is an exemplary flow diagram of rollback functionality of the hitless application upgrade, in accordance with various embodiments.

FIG. 4C is an exemplary flow diagram of rollback functionality of the hitless application upgrade, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 440, a new version is deployed in the SIP server for processing incoming messages as previously discussed. New messages which are associated with new calls can be directed to this newly deployed version, as illustrated in step 442. However, as shown in step 444, the new version of the application may not be functioning as previously expected. For example, new functionality added to the new version may cause an increase in latency or simply may not process messages as intended. In this scenario, a rollback can be performed.

As illustrated in step 446, the rollback can be initiated by undeploying the new version of the application. Subsequently, the incoming messages for all calls, established and new, can be routed back to the old version of the application, as illustrated in step 448. This can be achieved by restoring the previous servlet mappings that were changed by the SIP server. Furthermore, since the deployment and undeployment of the new version can be done on a single engine tier node, impact on performance of the entire SIP server can be minimal. In this manner, hitless application upgrade can improve performance of the SIP server and various call processing as discussed below.

Call Flow

Figure 5:
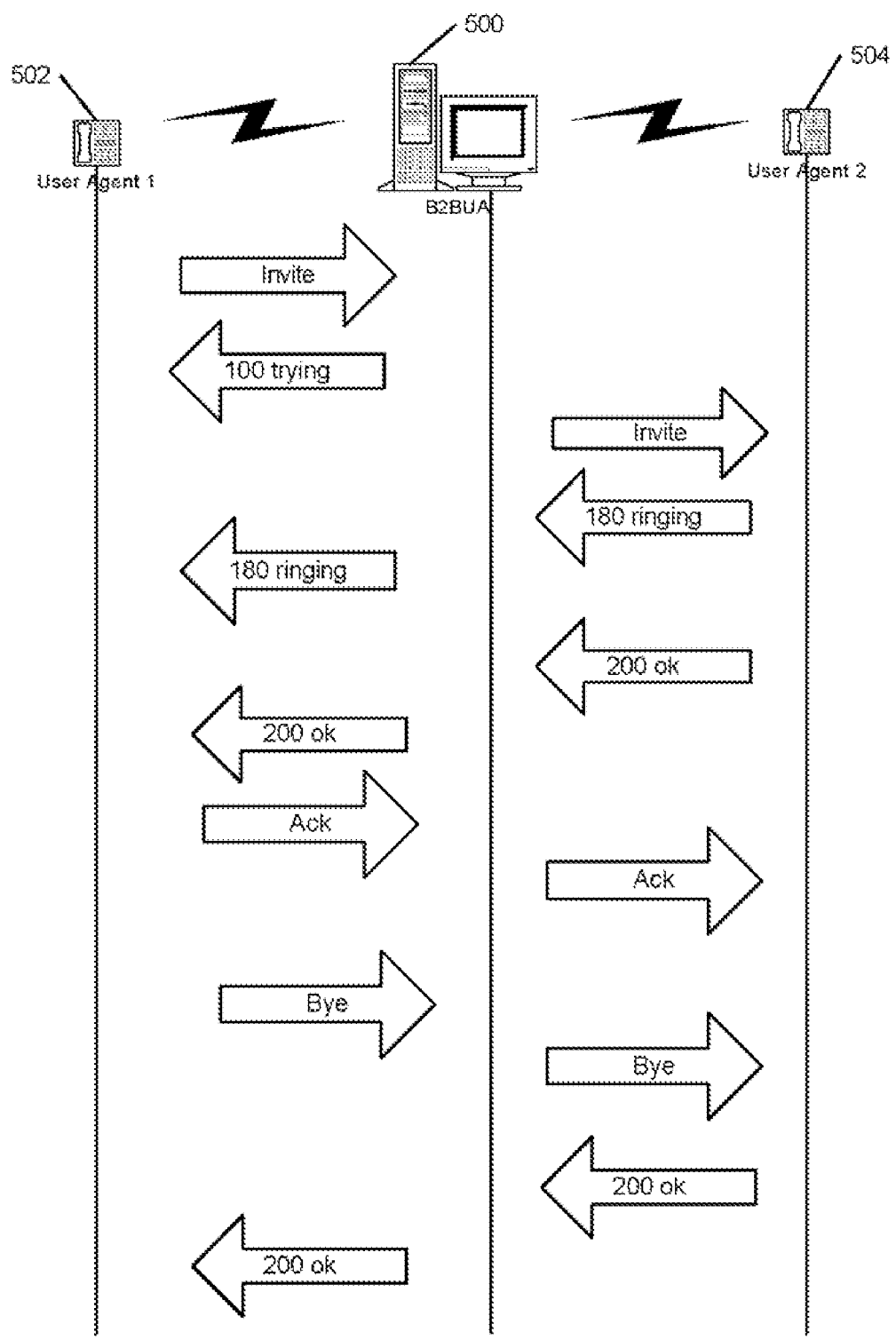
FIG. 5 is an exemplary illustration of a call flow in a typical SIP communication session, in accordance with various embodiments.

FIG. 5 is an exemplary illustration of a simplified call flow in a typical SIP communication session, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, a back to back user agent (B2BUA) 500, having a running SIP server thereon can take the place of being an intermediary between the communications sent between various users. This can be done for purposes of controlling the call and message flow between user agent 1 502 and user agent 2 504 and in order to prevent any unwanted behavior and messages (e.g. spamming, hacking, viruses, etc.) from being sent to the user agent device. It should be noted that although user agent 1 502 and user agent 2 504 are illustrated as telephones in FIG. 5, the SIP messages can come from various other sources as well. For example, the user agent can also be a cell phone, a wireless device, a laptop, an application or any other component that can initiate a SIP type of communication. Similarly, while FIG. 5 illustrates communications between two user agents (502, 504), there can be more such user agents taking part of a single communication session. For example, during a conference call, there may be 20 or 30 user agents for all attendees of the conference, each of which could send SIP messages to the B2BUA 500 and receive transmissions back therefrom.

Continuing with the illustration, a telephone call can be set up between user agent 1 502 and user agent 2 504 via the use of the SIP server. The first message sent from user agent 1 502 to the SIP server on the B2BUA 500 can be an invite message, requesting to set up a telephone call with user agent 2 504. The invite message can be received by the load balancer 202 of the SIP server and it can be directed to an engine in the engine tier 210 for processing.

In various embodiments, the engine tier (e.g. an application executing thereon) can then perform logic for determining various factors associated with the call, such as determining whether user agent 1 502 is allowed to make the type of call attempted to be initiated, determining whether the callee that will be contacted is properly identified, as well as any other logic that the server may need to calculate before attempting to set up a telephone call. The engine can then generate state around the fact that a call is being set up, including generating the proper long lived and short lived objects associated with the messages, as previously discussed. The engine can also determine how to find the target of the call (i.e. user agent 2 504) and the right path to route the message to the callee. As illustrated herein, user agent 1 is an originator (as well as the terminator) of the call and user agent 2 is referred to as the callee.

After receiving the invite message, the SIP server can send a "100 trying" message back to user agent 1 502, indicating that it has received the invite message and that it is in the process of handling it. The "100 trying" message is part of the SIP protocol definition and can be used by a server in order to stop the user agent from re-transmitting the invite request. In cellular phone environments, the user agent may have interference which might cause an interruption or loss of various messages. Therefore SIP protocol defines various re-transmission schemes in order to handle such mobility and interruptions. Messages such as "100 trying," "180 ringing," and "200 OK" are just some of the examples of messages defined in SIP for handling communication.

Continuing with the illustration, the SIP server can then send an invite message to the user agent 2 504 and can receive back a "180 ringing" message, indicating that user agent 2 504 has received the invitation and is now waiting for a user to answer. The SIP server engine tier can then transmit the "180 ringing" message back to user agent 1 502. When a person finally answers the phone, user agent 2 504 can then send a "200 ok" message to the SIP server, the server can transmit that message to user agent 1 502. The user agent 1 502 can send an acknowledgement ("Ack" message) to the SIP server which can be transmitted along to user agent 2 504 and at this point a sound transfer conversation can be set up between the two user agents. This sound transfer can be implemented via real transfer protocol (RTP) on a media server. At the end of the conversation, either user agent can choose to terminate the call by sending a "Bye" message. In this illustration, user agent 1 502 terminates the call by sending a "Bye" message to the SIP server which sends it off to user agent 2 504. After receiving back a "200 ok" message from user agent 2, the SIP server can transmit that message to user agent 1 and the conversation can be truly ended.

In various embodiments, the vertical lines such as those extending downward from the user agents 502, 504 and the B2BUA 500 can each illustrate and be referred to as a single call leg. The call flow for each call leg may be time sensitive as some messages should be received or sent before others can be initiated. For example, as illustrated herein, the user agent A 502 may continue to re-transmit the initial invite message until it receives a "100 trying" message from the B2BUA 500. As such, in some cases certain messages may need to be processed synchronously while others may be allowed to process in parallel.

It should be noted that this illustration of a call may be overly simplified for purposes of clarity. For example, there can be various other message transmissions (not illustrated) such as authentication messages for caller/callee, determining the type of user agent the SIP server is communicating with and various other handshaking messages that can be exchanged between the SIP server and the user agents. Furthermore, message transmitting steps may be added, changed, interrupted or rearranged in case of interference or failure of various components.

Timer Objects

As previously discussed, in various embodiments there may be specific sequences of messages exchanged between the SIP server and the user agents for controlling the flow of the call. These sequences can be controlled by various timer objects residing on the SIP server. As a nonlimiting illustration, after receiving the invite message from one user agent, the SIP server will typically forward that invite to another user agent and wait for a response. If no response is received within a period of time (e.g. a number of milliseconds), then the invite message may need to be retransmitted to the second user agent because it may be assumed that the user agent did not receive the first message. This type of re-transmission can be controlled by the protocol timer objects which may be residing in the state tier. In one embodiment, an initial T1 timer value of 500 milliseconds can control the retransmission interval for the invite request and responses and can also set the value of various other timers.

In various embodiments, there are also other timer objects which can be executing on the level of the entire call. For example, if after a specified period of time, nothing is heard back from either user agent, the entire call may be purged from the system. This specified period of time can also be controlled by firing a timer object.

In one embodiment, as engine tier servers add new call state data to the state tier, state tier instances queue and maintain a complete list of SIP protocol timers and application timers associated with each call. Engine tier servers can periodically poll the partitions of the state tier to determine which timers have expired given the current time. In order to avoid contention on the timer tables, multiple engine tier polls to the state tier can be staggered. The engine tier can then process the expired timers using threads in the sip.timer.Default execute queue. Thus, the processing of the timer objects can be executed by the engine server as determined by the state tier server. For example, the state tier can tell the engine A to execute the first half of all due timer objects (e.g. 1-100) and tell engine B to execute the other half (e.g. 101-200). The state tier can also simultaneously push the state onto the engine, since the state may need to be employed in executing the timer objects. The engines can then process the timer objects (e.g. by sending appropriate messages, ending appropriate calls) and can later again query poll the state tier for which timers have become due.

When used with the near cache, the state data may not need to be pushed onto the engine server since that data may already be available in the cache. Thus, when processing timers, the timers can be fetched from the state tier, however upon the timer firing, the engine can fetch the call state using the cache. Further performance optimization can be obtained by changing the selection of tiers to give affinity to the engine holding the cache for a particular call. Thus, the timers which are going to be executed can be sent to the appropriate engines which have the proper call state in the cache thereon.

In various embodiments, it may be preferable to synchronize system server clocks to a common time source (e.g. within a few milliseconds) in order achieve maximum performance. For example, an engine tier server with a system clock that is significantly faster than other servers may process more expired timers than the other engine tier servers. In some situations this may cause retransmits to begin before their allotted time and thus care may need to be taken to ensure against it.

In various embodiments, the SIP Servlet API can provide a timer service to be used by applications. There can be TimerService interface which can be retrieved from as a ServletContext attribute. The TimerService can define a "createTimer(SipApplicationSession appSession, long delay, boolean is Persistent, java.io.Serializable info)" method to start an application level timer. The SipApplicationSession can be implicitly associated with the timer. When a timer fires, an application defined TimerListener is invoked and ServletTimer object passed up, through which the SipApplicationSession can be retrieved which provides the right context of the timer expiry.

Failover

In various embodiments, the engine tier servers continually access the state tier replicas in order to retrieve and write call state data. In addition, the engine tier nodes can also detect when a state tier server has failed or become disconnected. For example, in one embodiment, when an engine cannot access or write call state data for some reason (e.g. the state tier node has failed or become disconnected) then the engine can connect to another replica in the partition and retrieve or write data to that replica. The engine can also report that failed replica as being offline. This can be achieved by updating the view of the partition and data tier such that other engines can also be notified about the offline state tier server as they access state data.

Additional failover can also be provided by use of an echo server running on the same machine as the state tier server. The engines can periodically send heartbeat messages to the echo server, which can continually send responses to each heartbeat request. If the echo server fails to respond for a specified period of time, the engines can assume that the state tier server has become disabled and report that state server as previously described. In this manner, even quicker failover detection is provided, since the engines can notice failed servers without waiting for the time that access is needed and without relying on the TCP protocol's retransmission timers to diagnose a disconnection.

Failover can also be provided for the engine tier nodes. As previously discussed, the engine tier nodes can periodically poll the state tier nodes in order to determine which timer objects it needs to execute. In turn, the state tier nodes can notice whenever the engine tier node has failed to poll. If a specified period of time elapses and the engine tier has not polled the state tier, the state server can then report that engine as unavailable (e.g. having failed or disconnected from the network). In this manner, failover can be implemented for both the state tier and the engine tier, thereby providing a more reliable and secure cluster for message processing.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing systems and methods for providing the SIP server architecture as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. Following is a brief list of advanced features:

Call logs: The ability to view calls made over a given period of time online, ability to associate names with phone numbers, integrate call log information to other applications such as IM.

Do not disturb: The ability to specify policies around receiving calls—for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. number of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A computer implemented method for upgrading an application, comprising:

maintaining a session initiation protocol (SIP) server running on an engine node, wherein the SIP server includes a SIP servlet container adapted to host applications;

deploying a first application to the SIP server container having an application name, wherein the application name specifies a version string associated with the first application, and wherein the SIP server strips the version string of the first application when the first application is deployed;

processing incoming messages by the first application deployed on the SIP server;

deploying a second application to the SIP server container while maintaining processing by the first application, wherein the second application includes the application name and version string, and wherein the version string of the second application is stripped when the second application is deployed;

receiving incoming messages by the engine node, wherein when the incoming messages are received by the engine node, the engine node
detects which application the incoming messages are directed based on the application name included in the incoming messages,
determines whether the incoming messages are associated with a new call or an established call,
directs the incoming messages for new calls to the second application; and
directs the incoming messages for previously established calls to the first application.

2. The method of claim 1 wherein directing incoming messages further includes:
receiving a message by an engine node in a cluster network from a load balancer;
determining by the SIP server on the engine node whether the message is associated with a new call or an established call; and
assigning the message to the first application if the message is associated with the established call, otherwise assigning the message to the second application.

3. The method of claim 1 further comprising:
maintaining a count of active calls being processed by the first application.

4. The method of claim 3 further comprising:
undeploying the first application when the count of active calls processed by the first application reaches zero.

5. The method of claim 1 further comprising:
determining that the second application is not functioning as intended; and
undeploying the second application and directing the incoming messages for new calls back to the first application.

6. The method of claim 1 wherein deploying the second application further includes:
activating the second application to process incoming messages.

7. The method of claim 1 wherein the previously established call is an SIP session established between the first application and a SIP client.

8. The method of claim 1, further comprising:
maintaining version information by the SIP server in order to differentiate between the first application and the second application wherein the second application is a newer version of the first application.

9. The method of claim 1 further comprising:
appending a version identifier string to the second application in order to distinguish the second application from the first application by the SIP server.

10. The method of claim 1 wherein directing the incoming messages further includes:
changing the servlet mappings by the SIP server such that incoming messages for new calls are routed to the second application and the incoming messages for old calls are routed to the first application.

11. A system for upgrading an application, said system comprising at least one central processing unit (CPU) that executes a set of instructions to implement:

a session initiation protocol (SIP) server running on an engine node, wherein the SIP server includes a SIP servlet container adapted to host applications;

a first application deployed to the SIP server container for processing incoming messages, wherein the first application includes an application name that specifies a version string associated with the first application, and wherein the SIP server strips the version string of the first application when the first application is deployed;

a second application deployed to the SIP server container, wherein the second application is deployed while maintaining processing by the first application, and wherein the second application includes the application name and version string, and wherein the version string of the second application is stripped when the second application is deployed; and wherein when incoming messages are received by the engine node, the engine node
detects which application the incoming messages are directed based on the application name included in the incoming messages,
determines whether the incoming messages are associated with a new call or an established call,
directs the incoming messages for new calls to the second application; and
directs the incoming messages for previously established calls to the first application.

12. The system of claim 11, further comprising:
a load balancer for receiving an incoming message and directing the message to an engine node in the cluster network wherein the SIP server running on the engine node determines whether the message is associated with a new call or an established call and assigns the message to the first version application if the message is associated with the established call, otherwise assigns the message to the second application.

13. The system of claim 11, further comprising:
a count of active calls being processed by the first application that is decremented as the first application finishes processing the messages for established calls.

14. The system of claim 13 wherein the first application is undeployed when the count of active calls processed by the first application reaches zero.

15. The system of claim 11 wherein the second version application is undeployed upon determining that the second version application is not functioning as intended and wherein the messages for new calls are directed to back to the first version application.

16. The system of claim 11 wherein a previously established call is an SIP session established between the first version application and a SIP client.

17. The system of claim 11 wherein the first version application and the second version application are simultaneously executing on the SIP server for a period of time.

18. The system of claim 11 further comprising:
a version identifier string appended to the second version application in order to distinguish the second version application from the first version application by the SIP server.

19. A non-transitory computer readable storage medium storing a set of instructions, said instructions when executed by one or more processors causing the one or more processors to:
- maintain a session initiation protocol (SIP) server running on an engine node, wherein the SIP server includes a SIP servlet container adapted to host applications;
- deploy a first application to the SIP server container having an application name, wherein the application name specifies a version string associated with the first application, and wherein the SIP server strips the version string of the first application when the first application is deployed;
- process incoming messages by the first application deployed on the SIP server;
- deploy a second application to the SIP server container while maintaining processing by the first application, wherein the second application includes the application name and version string, and wherein the version string of the second application is stripped when the second application is deployed;
- receive incoming messages by the engine node, wherein when the incoming messages are received by the engine node, the engine node
    - detects which application the incoming messages are directed based on the application name included in the incoming messages,
    - determines whether the incoming messages are associated with a new call or an established call,
    - directs the incoming messages for new calls to the second application; and
    - directs the incoming messages for previously established calls to the first application.

* * * * *

UNITED STATES PATENT AND TRADEMARK OFFICE
CERTIFICATE OF CORRECTION

PATENT NO. : 8,171,466 B2
APPLICATION NO. : 11/748767
DATED : May 1, 2012
INVENTOR(S) : Langen et al.

It is certified that error appears in the above-identified patent and that said Letters Patent is hereby corrected as shown below:

In the drawings: On sheet 1 of 9, in figure 1A, line 2, delete "Communication s" and insert -- Communications --, therefor.

In the drawings: On sheet 2 of 9, in figure 1B, Reference Numeral 112, line 1, delete "WSI/BPEL" and insert -- WS/BPEL --, therefor.

In column 1, line 35, delete "TELEOMMUNICATIONS" and insert -- TELECOMMUNICATIONS --, therefor.

In column 1, line 61, delete "this" and insert -- the --, therefor.

In column 2, line 1, after "OF" insert -- THE --.

In column 9, line 22, delete "webex" and insert -- webEx --, therefor.

In column 20, line 60, in claim 15, after "directed" delete "to".

Signed and Sealed this
Thirty-first Day of July, 2012

David J. Kappos
*Director of the United States Patent and Trademark Office*